United States Patent
Nicacio Braga

(10) Patent No.: US 12,554,981 B2
(45) Date of Patent: Feb. 17, 2026

(54) CLASSIFIER PROCESSING USING MULTIPLE BINARY CLASSIFIER STAGES

(71) Applicant: International Business Machines Corporation, Armonk, NY (US)

(72) Inventor: Igor Henrique Nicacio Braga, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1143 days.

(21) Appl. No.: 17/516,870

(22) Filed: Nov. 2, 2021

(65) Prior Publication Data

US 2023/0139437 A1    May 4, 2023

(51) Int. Cl.
*G06N 3/08* (2023.01)
*G06F 16/90* (2019.01)
(Continued)

(52) U.S. Cl.
CPC ............. *G06N 3/08* (2013.01); *G06F 18/211* (2023.01); *G06F 18/2431* (2023.01); *G06V 10/751* (2022.01); *G06F 16/90* (2019.01)

(58) Field of Classification Search
CPC .......... G06N 20/00; G06N 3/08; G06N 20/20; G06F 16/906; G06F 16/90; G06F 18/211;
(Continued)

(56) References Cited

U.S. PATENT DOCUMENTS

| 7,386,527 B2 | 6/2008 | Harris et al. |
| 7,742,641 B2 | 6/2010 | Ivanov et al. |

(Continued)

FOREIGN PATENT DOCUMENTS

| CN | 113111913 A | * | 7/2021 | |
| WO | WO-2012134180 A2 | * | 10/2012 | ............. G06F 17/10 |

OTHER PUBLICATIONS

Multi-class Classification—One-vs-All & One-vs-One, Amey Band, https://towardsdatascience.com/multi-class-classification-one-vs-all-one-vs-one-94daed32a87b (Year: 2020).*
(Continued)

*Primary Examiner* — Kamran Afshar
(74) *Attorney, Agent, or Firm* — Garg Law Firm, PLLC; Rakesh Garg; Kimberly Zillig

(57) ABSTRACT

An embodiment generates a training batch of data points from training data for a plurality of classes and builds a multi-class classifier having a series of binary classifiers arranged in a first order. Each of the binary classifiers is associated with a respective class. The embodiment trains the multi-class classifier with the binary classifiers arranged in a first order and, at each binary classifier, the embodiment identifies data points as belonging to the class associated with the respective classifier and updates the training batch to exclude the classified data points. The embodiment then modifies the multi-class classifier by changing the order of classifiers and repeats the training of the multi-class classifier with the series of binary classifiers arranged in a second order. The embodiment then selects a final configuration of the multi-class classifier based at least in part on a comparison of first training results to the second training results.

20 Claims, 10 Drawing Sheets

(51) Int. Cl.
*G06F 18/211* (2023.01)
*G06F 18/2431* (2023.01)
*G06V 10/75* (2022.01)

(58) Field of Classification Search
CPC .. G06F 18/2431; G06F 18/214; G06V 10/751
See application file for complete search history.

(56) References Cited

U.S. PATENT DOCUMENTS

| | | | |
|---|---|---|---|
| 10,552,736 B1* | 2/2020 | Abad | G06N 3/08 |
| 2008/0319932 A1* | 12/2008 | Yih | G06Q 10/06 |
| | | | 706/20 |
| 2018/0089581 A1* | 3/2018 | Zang | G06N 20/00 |
| 2021/0173622 A1* | 6/2021 | Craik | G06F 9/44521 |

OTHER PUBLICATIONS

Enhancement of multi-class support vector machine construction from binary learners using generalization performance, Songsiri et al, https://www.sciencedirect.com/science/article/pii/S0925231214012041 (Year: 2015).*

Bianca Zadrozny and Charles Elkan. 2002. Transforming classifier scores into accurate multiclass probability estimates. https://dl.acm.org/doi/abs/10.1145/775047.775151 (Year: 2002).*

Hashemi et al., Adapted One-versus-All Decision Trees for Data Stream Classification, IEEE Transactions on Knowledge and Data Engineering, vol. 21, No. 5, May 2009, pp. 624-637.

Chmielnicki et al., Using the one-versus-rest strategy with samples balancing to improve pairwise coupling classification, Mar. 2016, Int. J. Appl. Math. Comput. Sci., 2016, vol. 26, No. 1, pp. 191-201.

Ramanan et al., Unbalanced Decision Trees for multi-class classification, Aug. 9-11, 2007, 2007 International Conference on Industrial and Information Systems.

Ding et al., Tree-Based Integration of One-versus-Some (OVS) Classifiers for Multiclass Classification, 2021.

Yijing et al., Adapted ensemble classification algorithm based on multiple classifier system and feature selection for classifying multi-class imbalanced data, Knowledge-Based Systems, vol. 94, Feb. 15, 2016.

IBM Cloud Education, Machine Learning, Jul. 15, 2020, https://www.ibm.com/analytics/machine-learning.

Brownlee, Difference Between Classification and Regression in Machine Learning, Dec. 11, 2017, https://machinelearningmastery.com/classification-versus-regression-in-machine-learning/.

Nabi, Machine Learning—Multiclass Classification with Imbalanced Dataset, Dec. 23, 2018, https://towardsdatascience.com/machine-learning-multiclass-classification-with-imbalanced-data-set-29f6a177c1a.

Rocca, Handling imbalanced datasets in machine learning, Jan. 28, 2019, https://towardsdatascience.com/handling-imbalanced-datasets-in-machine-learning-7a0e84220f28.

Krishnamurthy, Understanding Data Bias, Sep. 12, 2019, https://towardsdatascience.com/survey-d4f168791e57.

Ghoneim, 5 Types of bias & how to eliminate them in your machine learning project, Apr. 16, 2019, https://towardsdatascience.com/5-types-of-bias-how-to-eliminate-them-in-your-machine-learning-project-75959af9d3a0.

Bergstra et al., Random Search for Hyper-Parameter Optimization, Feb. 12, 2012, Journal of Machine Learning Research 13 (2012) 281-305.

Band, Multi-class Classification—One-vs-All & One-vs-One, May 9, 2020, https://towardsdatascience.com/multi-class-classification-one-vs-all-one-vs-one-94daed32a87b.

* cited by examiner

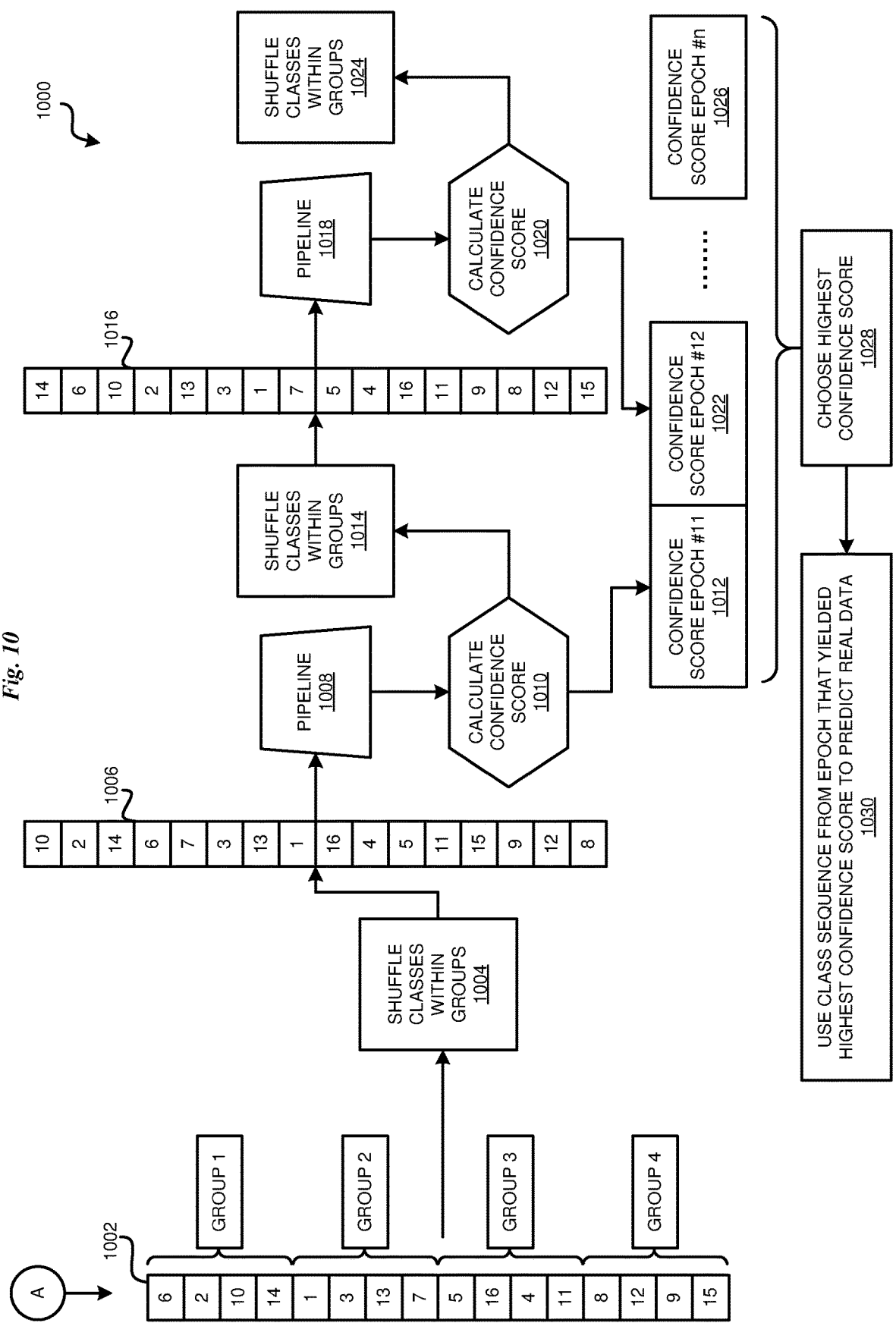

CLASSIFIER PROCESSING USING MULTIPLE BINARY CLASSIFIER STAGES

BACKGROUND

The present invention relates generally to a method, system, and computer program product for data processing. More particularly, the present invention relates to a method, system, and computer program product for classifier processing using multiple binary classifier stages.

Artificial intelligence (AI) technology has evolved significantly over the past few years. Modern AI systems include machine learning systems that are achieving human level performance on cognitive tasks like converting speech to text, recognizing objects and images, or translating between different languages. This evolution holds promise for new and improved applications in many industries.

An Artificial Neural Network (ANN)—also referred to simply as a neural network—is an example of a machine learning system that is often used for performing data classification tasks. ANNs are processing devices (algorithms and/or hardware) that are made up of a number of highly interconnected processing elements (nodes) that process information by their dynamic state response to external inputs. ANNs are loosely modeled after the neuronal structure of the mammalian cerebral cortex, but on much smaller scales. A large ANN might have hundreds or thousands of processor units, whereas a mammalian brain has billions of neurons with a corresponding increase in magnitude of their overall interaction and emergent behavior.

A machine learning system that performs data classification is sometimes referred to as a classifier. A classifier is a type of ANN that includes an algorithm that learns a function that separates two or more classes of data. There are many different types of classifiers. Examples include image classifiers that classify images based on what is being depicted (e.g., classifying images as depicting a cat or a dog) and sentiment classifiers that classify text based on what is being expressed (e.g., classifying text as expressing a positive or negative opinion).

A feedforward neural network is an ANN in which connections between the units do not form a cycle. A convolutional neural network (CNN) is an example of a feed-forward ANN that is sometimes used as a classifier. In a CNN, the connectivity pattern between the nodes (neurons) is inspired by the organization of the animal visual cortex, whose individual neurons are arranged to respond to overlapping regions tiling a visual field. As a result, CNNs are particularly efficient in recognizing image features, such as by differentiating pixels or pixel regions in a digital image from other pixels or pixel regions in the digital image. Generally, a CNN is designed to recognize images or parts of an image, such as detecting the edges of an object recognized on the image, for tasks such as image classification.

A recurrent neural networks (RNN) is another example of a type of ANN that is sometimes used as a classifier. An RNN includes recurrent connections (i.e., feedback connections) that form cycles in the network's topology. In an RNN, a neuron feeds back information to itself in addition to passing it to the next neuron in the RNN. Computations derived from earlier inputs are fed back in the network, which gives an RNN a form of short-term memory. Feedback networks, such as RNNs, are dynamic in that the state of an RNN is continuously changing until it reaches an equilibrium point. For this reason, RNNs are particularly well-suited for detecting relationships across time in a given set of data. Long-Short Term Memory (LSTM) and Gated Recurrent Units (GRU) are types of RNNs that include a state-preserving mechanism through built-in memory cells. These types of RNNs are particularly well-suited for multivariate time series data analysis and forecasting, handwriting recognition, natural language processing, and task synthesis.

A deep neural network (DNN) is another example of an ANN that is sometimes used as a classifier. A DNN has multiple hidden layers of units between the input and output layers. Similar to shallow ANNs, DNNs can model complex non-linear relationships. DNN architectures generate compositional models where the object is expressed as a layered composition of image primitives. The extra layers enable composition of features from lower layers, allowing for the potential of modeling complex data with fewer units than a similarly performing shallow ANN.

SUMMARY

The illustrative embodiments provide for classifier processing using multiple binary classifier stages. An embodiment includes generating a training batch of data points from training data associated with a plurality of classes. The embodiment also includes building a multi-class classifier having a series of binary classifiers arranged in a first order, where each of the series of binary classifiers is associated with a respective class of the plurality of classes. The embodiment also includes training the multi-class classifier with the series of binary classifiers being arranged in the first order using the training batch of data points, where the training comprises, at each binary classifier in succession, (a) identifying data points as belonging to the associated class resulting in classified data points, and (b) updating the training batch to exclude the classified data points prior to the training batch being inputted into a subsequent binary classifier. The embodiment also includes modifying the multi-class classifier by changing the order of the series of binary classifiers resulting in the series of binary classifiers being arranged in a second order. The embodiment also includes repeating the training of the multi-class classifier with the series of binary classifiers being arranged in the second order using the training batch of data points. The embodiment also includes selecting a final configuration of the multi-class classifier based at least in part on a comparison of first training results from training with the series of binary classifiers arranged in the first order to second training results from training with the series of binary classifiers arranged in the second order. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 10 depicts a schematic flow diagram of an example second epoch of a classification process in accordance with an illustrative embodiment.

DETAILED DESCRIPTION

Figure 1:
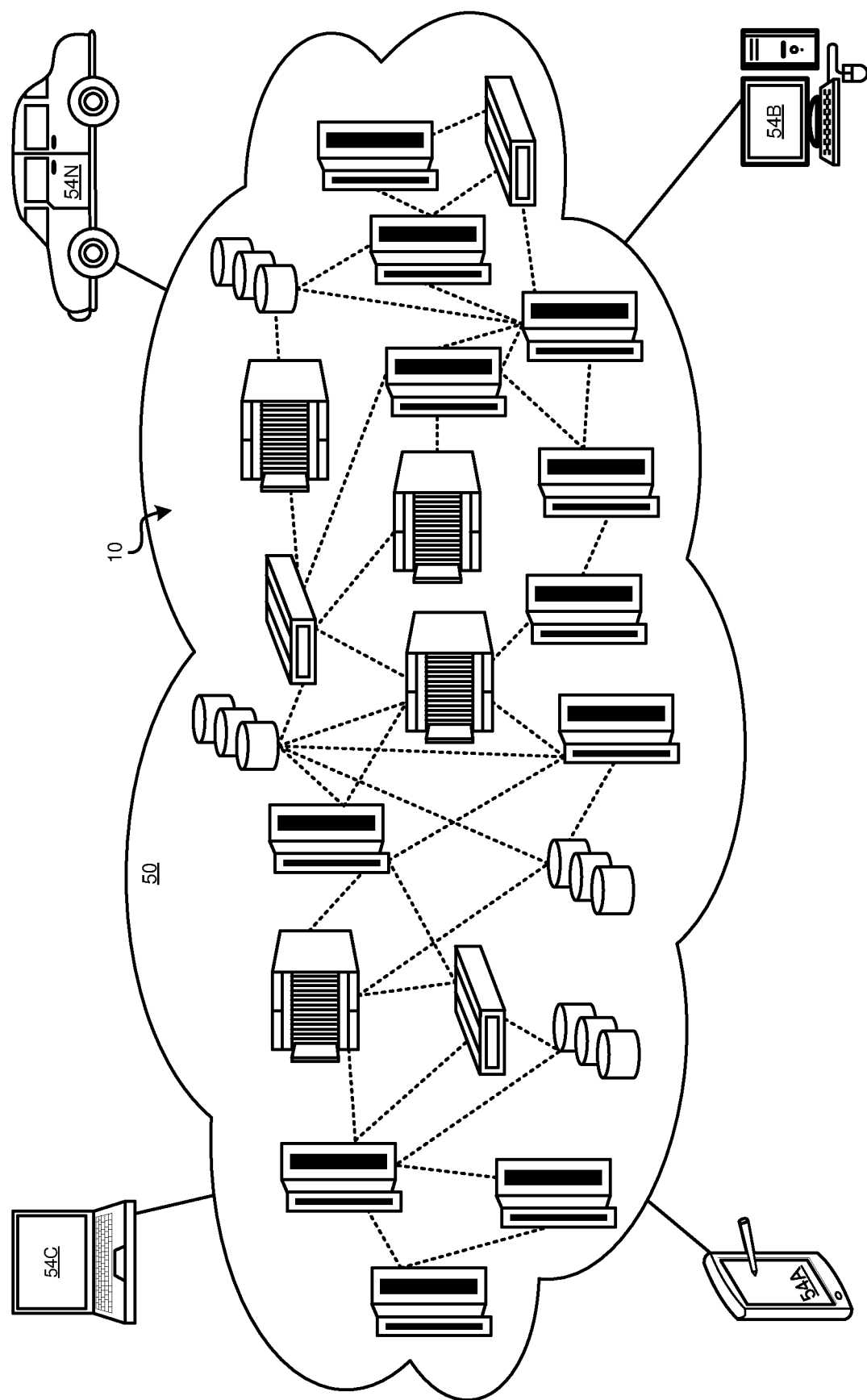
FIG. 1 depicts a cloud computing environment according to an embodiment of the present invention.

A classifier is a machine learning system that is used to predict class labels for categorical data. The most basic form of classification is a binary classification problem. In a binary classification problem, a machine learning system attempts to distinguish between two classes of data. For example, a binary classifier may be trained to predict whether each inputted data point represents true or false, one or zero, yes or no, big or small, and so on.

An example of a binary classifier used for image classification receives a series of images as data points and classifies the images as depictions of cats or dogs. Each of these data points will have image characteristics, referred to as features, and a class associated with them. The binary classifier will learn the features in order to try to correctly classify each data point into either a dog class or a cat class.

Classification problems become more complex as the number of classes increases. Multi-class classification, as used herein, refers to classification involving three or more classes, in contrast to binary classification, which refers to classification involving two classes. An example of a multi-class classifier used for image classification receives a series of images as data points and classifies the images as depictions of cats, dogs, or fish. The multi-class classifier will learn the features of the images in order to try to correctly classify each data point into either a dog class, cat class, or fish class. Other examples of multi-class classifiers have more than three classes, for example having a dozen or more classes, increasing the complexity of the multi-class classifier as the number of classes increases. For this reason, building multi-class classifiers is not as straight forward as building binary classifiers.

Multi-class classifiers also become more susceptible to bias as the number of classes increases. One reason for this is that it becomes increasingly difficult to find training data that equally represents all classes as the number of classes increases. For example, a particular dataset containing three different classes might be composed such that 75% of the data points belong to class 1, 20% of the data points belong to class 2, and 5% of the data points belong to class 3. This imbalance will tend to introduce bias that skews the class predictions made by a multi-class classifier unless steps are taken to compensate for the disproportionate class representation in the training data.

There are many techniques that may be employed to try to compensate for imbalanced training data. Some of the more basic techniques include undersampling the over-represented classes, oversampling the under-represented classes, or generating synthetic data to balance the classes. However, these techniques tend to be difficult and time-consuming tasks, and are not effective or practical in all situations. There are other approaches for dealing with imbalanced training data, such as grid search and random search techniques, which involve searching for hyperparameters that will compensate for the imbalanced data. Grid search is a technique that involves searching for hyperparameter values from a pre-determined set of values defined by the user, while random search, as the name implies, involves iterating through a series of randomly-selected hyperparameter values. However, these techniques are very complex, time consuming, and are not always effective.

Aspects of the present disclosure address the deficiencies described above by providing mechanisms (e.g., systems, methods, machine-readable media, etc.) that train a multi-class classifier using a binary classifier hierarchy with diminishing candidates. This approach converts a multi-class training problem into a series of binary class training problems in which data points are gradually removed from the training dataset as the training process progresses through each of the binary classifiers. Since data points are removed as they are classified rather than being re-evaluated by subsequent binary classifiers, the effects of imbalanced training data can be mitigated by arranging the binary classifiers to address the lesser-represented classes first.

For example, in some embodiments, a multi-class classifier includes a series of one-vs-all binary classifiers arranged to reduce the effects of imbalanced training data. In some such embodiments, as the training data progresses through the series of one-vs-all binary classifiers, data points classified as the "one" class by a binary classifier are removed from the training data before the training data progresses to a subsequent classifier in the series of binary classifiers. By not carrying over the data points that have already been classified, the disclosed embodiments are able to prevent bias in the resulting trained model. In some embodiments, the one-vs-all classifiers each classify training data points based on the probability scores. If the classified data points remained in the training data to be reevaluated by subsequent binary classifiers, the probability scores from each classifier could intensify biases if present. This would result in high probability scores that do not accurately reflect the appropriate class for each data point. Disclosed embodiments avoid this consequence of bias by removing data points from the training data as their classes are predicted.

In some illustrative embodiments, a multi-class classification system automatically determines an appropriate order in which to arrange the series of binary classifiers that will reduce the effects of imbalanced training data. This approach results in a simple and effective technique for improving the accuracy of multi-class classifiers. This approach is also highly scalable since any number of stages (corresponding to respective classes) may be arranged to mitigate the effects of biased and imbalanced training datasets. As a result, the disclosed embodiments provide for an efficient, scalable, and simplified approach to reduce bias by mitigating the effects of imbalance in multi-class training data.

In some embodiments of the present disclosure, system, methods and algorithms may be presented to automatically score and rank different arrangements of a binary classifier hierarchy according to the confidence or accuracy of their results. In some such embodiments, a binary classifier hierarchy may be constructed without requiring a separate evaluation of the training dataset to detect bias or balance issues. This results in a more efficient technique for training a multi-class model while also improving the accuracy of the resulting trained multi-class model. Also, the methods of the present disclosure are equally applicable to a wide variety of different types of classifier problems involving any number of classes, making the disclosed processes domain-independent and easily adaptable to many different implementations.

In some embodiments, a multi-class classification system performs an adaptive one-vs-all classification process to train n distinct classifiers, transforming a multi-class classification problem into a series of binary classification problems. More specifically, a multi-class classification system builds a multi-class classifier having a series of binary classifiers with one classifier for each class. The classification system receives training data (or a random sampling of training data) and inputs the training data into a series of binary classifiers. As the training data progresses through the binary classifiers, each binary classifier may classify one or more of the data points. After each binary classifier, before the training data is input into the next binary classifier, any data points that have been classified are removed from the training data and stored in memory as classified data points. In some embodiments, each classified data point is stored with a value, such as a confidence score, that was generated by the binary classifier when classifying that data point.

Once all of the training data has progressed through the series of binary classifiers, a final multi-class classifier receives and classifies any data points that remain unclassified. Once all of the data points have been classified, this completes an epoch. In some embodiments, the classification system performs multiple epochs, where the classification system changes the order of binary classifiers (and therefore the order of classes) before each epoch. In some embodiments, the classification system may additionally, or alternatively, change the type of classifier being used as one or more of the binary classifiers. For example, in some embodiments, the binary classifiers may be implemented using K-Nearest Neighbors, Support Vector Machines, Perceptrons, Naive Bayes, Decision Trees, or Logistic Regression models. In some embodiments, the classification system may use different combinations of these and other types of binary classification models during different epochs. After the last epoch is completed, the classification system compares the performance of each of the epochs to determine the best arrangement for the multi-class classifier.

In some embodiments, a classification system uses a training process for training a multi-class classifier to distinguish between n classes, where n may be any integer. For the sake of explanation, the classes may be numbered and represented as classes $A=\{i|1 \leq i \leq n\}$. The multi-class classifier comprises a series of n one-versus-all binary classifiers. Each binary classifier is a one-versus-all classifier configured to distinguish between a respective class i and all other classes $A\backslash\{i\}$. The process inputs a training batch of data points or "samples" into the first binary classifier in a series of one-versus-all classifiers. The binary classifier processes each data point and predicts whether each data point belongs in class i or the "all other" class (i.e., classes $A\backslash\{i\}$). In some embodiments, the binary classifier outputs a confidence value representative of a likelihood that the data point under consideration belongs in class i.

As a non-limiting example, suppose a training dataset sample has data points for three classes that will be referred to as Class 1, Class 2, and Class 3. The classification system builds a multi-class classifier having three binary classifiers connected in series. Each binary classifier is associated with a respective one of the three classes. For the first epoch, the binary classifiers are arranged such that the first binary classifier is associated with Class 1, the second binary classifier is associated with Class 2, and the third binary classifier is associated with Class 3. Note that it is not necessary for the classifiers to be arranged in any particular order for the first epoch; any arrangement may be selected. Each of the binary classifiers uses a one-versus-all approach to classifying data points. This means that the first binary classifier, being associated with Class 1, will classify each inputted data point as either "Class 1" or "Not Class 1" (i.e., Classes 2 and 3), the second binary classifier, being associated with Class 2, will classify each inputted data point as either "Class 2" or "Not Class 2" (i.e., Classes 1 and 3), and the third binary classifier, being associated with Class 3, will classify each inputted data point as either "Class 3" or "Not Class 3" (i.e., Classes 1 and 2).

In some embodiments, classification system commences the training process by inputting data points from the training dataset into the first binary classifier. In some embodiments, the classification system determines whether each data point is considered to be "classified" or "predicted" as belonging in class i. In some embodiments, a data point is considered to be classified as class i if a confidence value generated by the binary classifier exceeds a threshold confidence value. In some embodiments, the threshold confidence value is a user-defined threshold value. In some embodiments, data points predicted as class i are set aside and are not evaluated by any of the binary classifiers remaining in the series of binary classifiers. The remaining data points that have not yet been classified are carried forward.

Thus, following the above example, the first binary classifier, being associated with class 1, labels all data points it predicts as Class 1 with a "1" and labels the rest with a "0." The data points having the label "1" are set aside, and the data points having the label "0" are inputted into the second binary classifier. The second binary classifier, being associated with class 2, labels all data points it predicts as Class 2 with a "1" and labels the rest with a "0." The data points having the label "1" are set aside, and the data points having the label "0" are inputted into the third binary classifier. The third binary classifier, being associated with class 3, labels all data points it predicts as Class 3 with a "1" and labels the rest with a "0." The data points having the label "1" are set aside, and the data points having the label "0" are inputted into a final classifier.

At the final classifier stage, there might still be some data points that were not classified by any of the binary classifiers. For example, suppose the threshold confidence values are set to 0.8, and a particular data point was processed by a multi-class classifier having a series of three binary classifiers (n=3). The data point received a confidence score of 0.6 from the first binary classifier, a confidence score of 0.3 from the second binary classifier, and a confidence score of 0.2 from the third binary classifier. None of these values met the threshold confidence value of 0.8, so the data point was not classified. In some embodiments, the classification system includes a last classifier for classifying these datapoints.

The last classifier is configured as a catch-all that predicts categories for all remaining data points. In some embodiments, the final classifier is a multi-class voting classifier to predict the remaining entries. For example, in some embodiments, the final classifier classifies a data point by comparing the confidence scores from each of the binary classifiers and classifies the data point with the class associated with the binary classifier that outputs the highest confidence score. For example, suppose the threshold values are set to 0.8, and a particular data point was given a confidence score of 0.6 from the first binary classifier, a confidence score of 0.3 from the second binary classifier, and a confidence score of 0.1 from the third binary classifier. None of these values met the threshold value of 0.8, but the first binary classifier gave the highest confidence score of 0.6, so this data point is classified as Class 1.

In some embodiments, once all of the data points have been classified, the classification system combines the confidence scores associated with each classification result into an overall confidence score, and then stores the overall confidence score in memory associated with the completed epoch. The classification system then selects another sequence for the binary classifiers, for example Class 2, followed by Class 3, followed by Class 1. The classification system then repeats the same procedure as the first epoch, passing the training data through each of the binary classifiers in succession and setting aside classified data points after each binary classifier, until all of the data points have been classified and an overall confidence score is determined for the second epoch.

In some embodiments, the classification system continues performing epochs, each with a unique sequence of binary classifiers, until every possible permutation has been tried or a threshold number of epochs has been reached. The reason for using a threshold epoch value is because as the number of classes n increases, the number of possible permutations increases as n!. In the case of 3 classes there will be 6 possible epochs, as follow:

I. class1, class2, class3
 II. class1, class3, class2
 III. class2, class1, class3
 IV. class2, class3, class1
 V. class3, class1, class2
 VI. class3, class2, class1

On the other hand, for 32 different classes, there would be 32! permutations, which is a number close to ~10^35 different orderings. Therefore, the default value for the threshold number of epochs can be set to a much lower number that is more feasible. In some embodiments, the classification system randomizes the order of classifiers in each epoch in order to explore the most about the data distribution. After the threshold number of epochs is completed, the classification system learns about the previous orders and tries to make an educated guess for the next epochs. It does so by choosing amongst the epoch that yielded the highest confidence score in the first threshold number of epochs and tries to modify the order of that particular epoch. For example, in some embodiments, the classification system will choose regions in which to move the order of the classes. This allows the classification system to learn the best order in which classes should be chosen to be classified that will yield the highest accuracy.

In some embodiments, once an epoch has been completed, the classification system determines if a threshold number of epochs have been performed. If the number of epochs is still less than the threshold epoch number, the classification system rearranges the binary classifiers before beginning another epoch. Initially, the series of binary classifiers can be thought of as a single group, so the binary classifiers are rearranged into a randomly determined order. Once the threshold number of epochs has been reached, the classification system arranges the classifiers based on the sequence that yielded highest confidence score, and then divides that sequence of classifiers into two or more groups.

For example, suppose a multi-class classifier has eight binary classifiers associated with eight respective classes Class 1 through Class 8. After a threshold number of epochs, the classification system determines that the classifier order that yielded the highest confidence score is 1-3-7-4-6-2-8-5. The classification system then divides this sequence into two (or more) equal groups, with the first group being classes 1-3-7-4 and the second group being 6-2-8-5. The classification system then rearranges the order of classifiers in each group into random new orders, such as 7-3-4-1 for the first group and 8-2-6-8 for the second group, with the groups remaining in the same order.

In some embodiments, the classification system groups some of the classes to try to leverage the global relation between the classes. How and when the classification system segregates the sequence of classes into groups may vary depending on the dataset. This also allows the classification system to output the most optimal hierarchy of classes that yielded the best result, resulting in higher accuracy. Also, the order of classes indicates which classes have higher confidence with more accuracy than existing solutions. Additionally, one can use the hierarchy history of the model to further study the dataset's characteristics, such as correlation among different features. In some embodiments, the classification system then performs another epoch using this sequence of binary classifiers.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, training data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
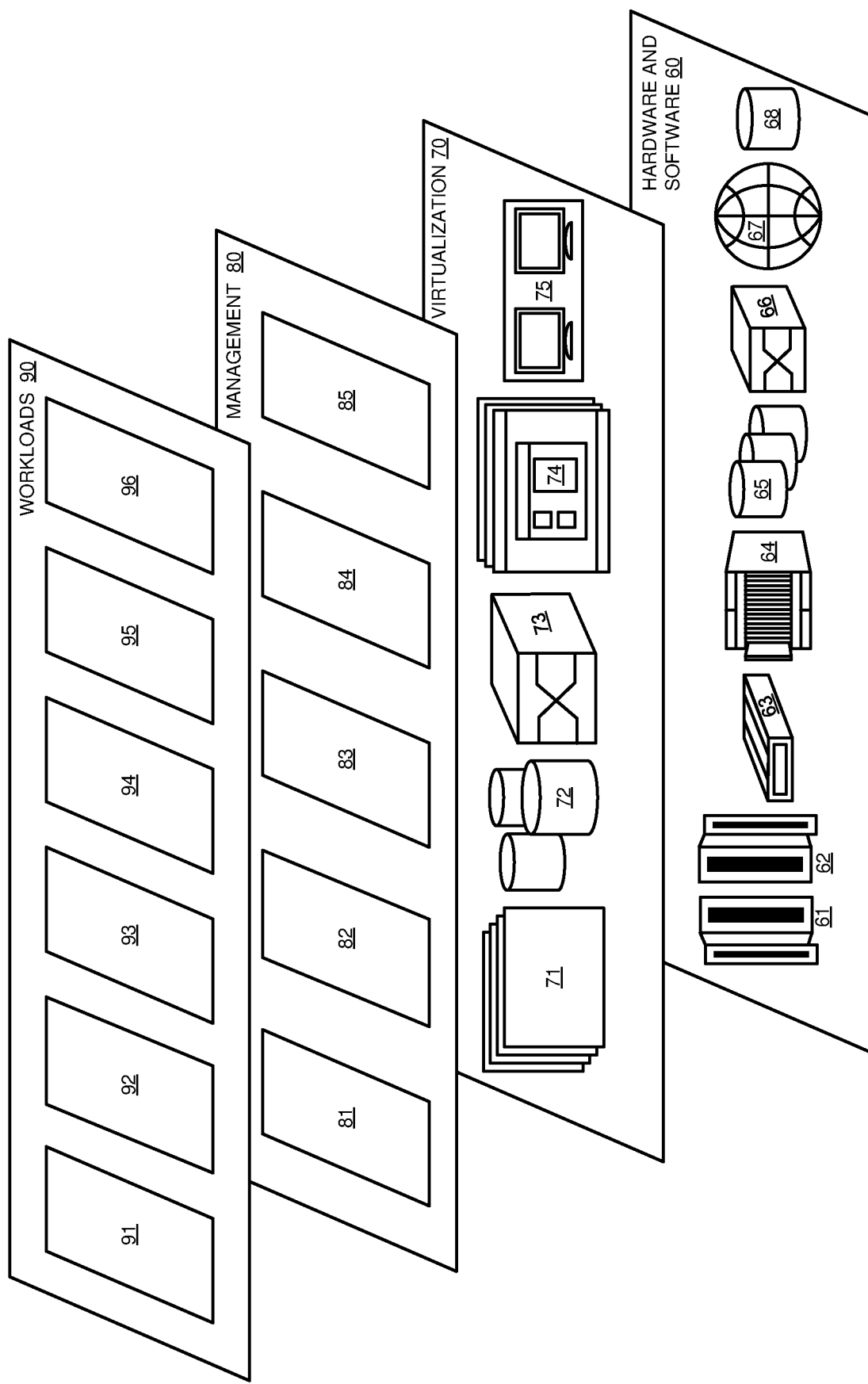
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in the context of the illustrated embodiments of the present disclosure, various workloads and functions 96 for classifier processing using multiple binary classifier stages. In addition, workloads and functions 96 for classifier processing using multiple binary classifier stages may include such operations as data analysis and machine learning (e.g., artificial intelligence, natural language processing, etc.), as described herein. In some embodiments, the workloads and functions 96 for classifier processing using multiple binary classifier stages also works in conjunction with other portions of the various abstractions layers, such as those in hardware and software 60, virtualization 70, management 80, and other workloads 90 (such as data analytics processing 94, for example) to accomplish the various purposes of the disclosed embodiments.

Figure 3:
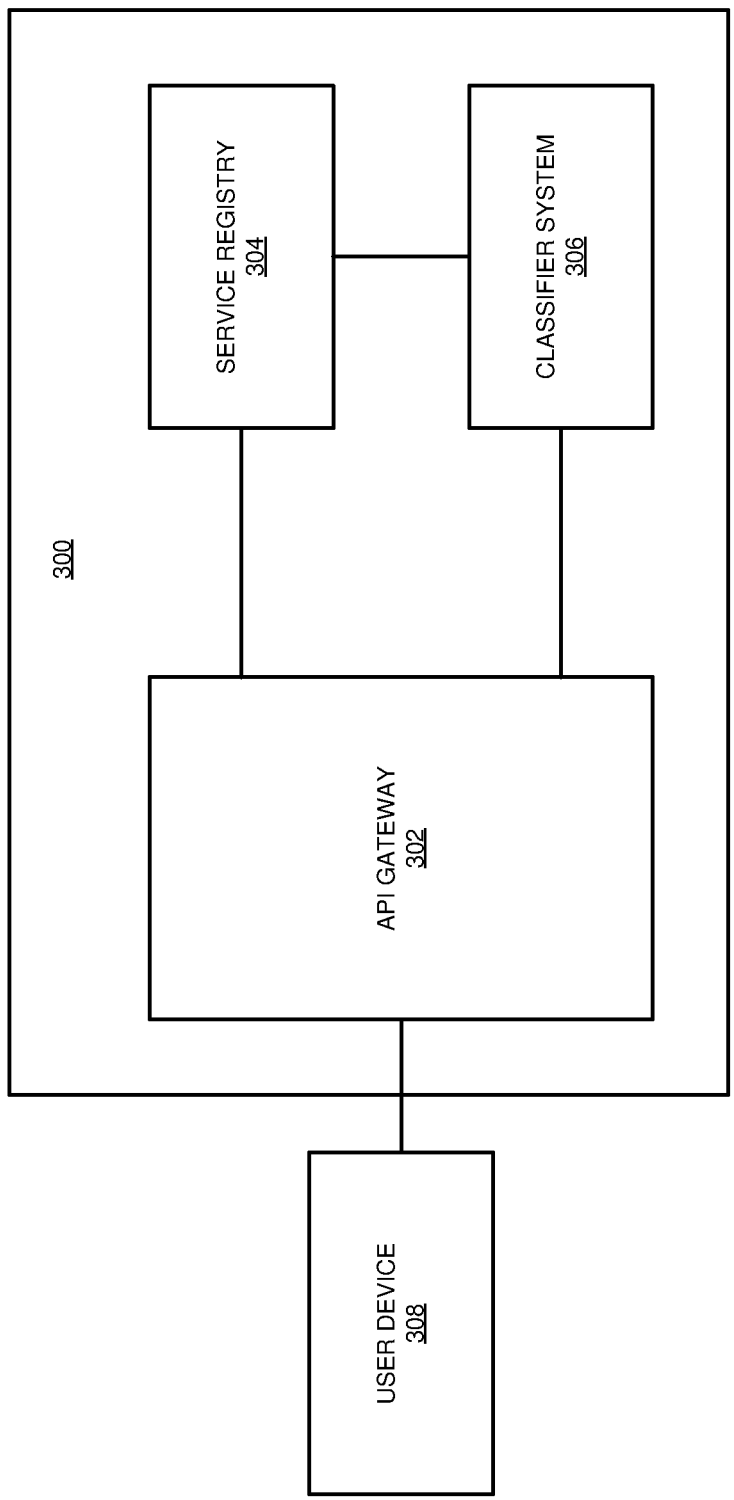
FIG. 3 depicts a block diagram of an example service infrastructure that includes a classifier system in accordance with an illustrative embodiment.

With reference to FIG. 3, this figure depicts a block diagram of an example service infrastructure 300 that includes a classifier system 306 in accordance with an illustrative embodiment. In some embodiments, the classifier system 306 is deployed in workloads layer 90 of FIG. 2. By way of example, in some embodiments, classifier system 306 is implemented as classifier processing 96 in FIG. 2.

In the illustrated embodiment, the service infrastructure 300 provides services and service instances to a user device 308. User device 308 communicates with service infrastructure 300 via an API gateway 302. In various embodiments, service infrastructure 300 and its associated classifier system 306 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 308 connects with API gateway 302 via any suitable network or combination of networks such as the Internet, etc. and use any suitable communication protocols such as Wi-Fi, Bluetooth, etc. Service infrastructure 300 may be built on the basis of cloud computing. API gateway 302 provides access to client applications like classifier system 306. API gateway 302 receives service requests issued by client applications, and creates service lookup requests based on service requests. As a non-limiting example, in an embodiment, the user device 308 is a card reader device that executes an access routine to determine whether to grant access to a workspace in response to a sensed access card.

In the illustrated embodiment, service infrastructure 300 includes a service registry 304. In some embodiments, service registry 304 looks up service instances of classifier system 306 in response to a service lookup request such as one from API gateway 302 in response to a service request from user device 308. For example, in some embodiments, the service registry 304 looks up service instances of classifier system 306 in response to requests related to machine learning classification from the user device 308.

In some embodiments, the service infrastructure 300 includes one or more instances of the classifier system 306.

In some such embodiments, each of the multiple instances of the classifier system 306 run independently on multiple computing systems. In some such embodiments, classifier system 306, as well as other service instances of classifier system 306, are registered in service registry 304.

In some embodiments, service registry 304 maintains information about the status or health of each service instance including performance information associated each of the service instances. For example, such performance information may include several types of performance characteristics of a given service instance (e.g., cache metrics, etc.). In some embodiments, the extended service registry 304 ranks service instances based on their respective performance characteristics, and selects top-ranking service instances for classification requests. In some such embodiments, in the event that a service instance becomes unresponsive or, unhealthy, the service registry will no longer provide its address or information about this service instance to other services.

Figure 4:
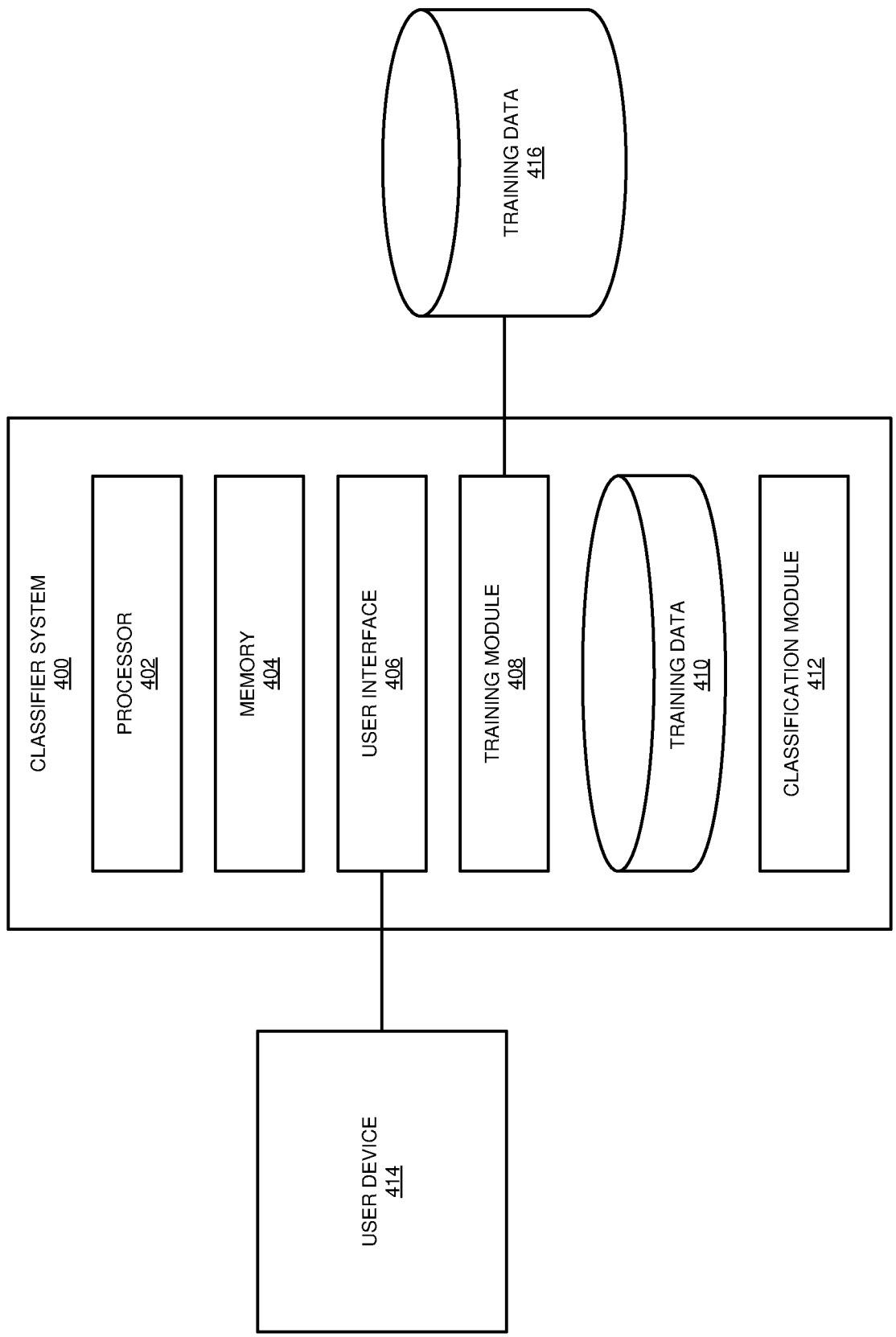
FIG. 4 depicts a block diagram of an example classifier system in accordance with an illustrative embodiment.

With reference to FIG. 4, this figure depicts a block diagram of an example classifier system 400 in accordance with an illustrative embodiment. In a particular embodiment, the classifier system 400 is an example of the workloads and functions 96 for classifier processing of FIG. 1.

In some embodiments, the classifier system 400 includes a processor 402, memory 404, a user interface 406, a training module 408, a training data database 410, and a classification module 412. In alternative embodiments, the classifier system 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the classifier system 400 includes a processing unit ("processor") 402 to perform various computational and data processing tasks, as well as other functionality. The processing unit 402 is in communication with memory 404. The classifier system 400 includes a user interface 406, which may include a graphic or command line interface that allows a user to communicate with the classifier system 400 using a user device 414, such as a computer, tablet, or smart phone. In some embodiments, the user interface 406 allows communication with the user device 414 via an API gateway (e.g., API gateway 302 of FIG. 3). In some embodiments, the user interface 406 receives one or more bodies of text, images, video frames, or other content for classification by the classification module 412.

In some embodiments, before the classification module 412 is put into production, it is trained to perform the desired classification tasks by the training module 408. The training module 408 trains the classification module 412 using local training data 410 and/or remote training data 416. In some embodiments, training data includes data points in the form of text, images, video, or other content for classification. In some embodiments, the training data includes a corpus of labels for labeling the data points in the training data.

In some embodiments, the classification module 412 includes a machine learning model for performing multi-class classification. In some embodiments, the machine learning model performs multi-class classification using a series of binary classifier models. Examples of suitable binary classifier models include K-Nearest Neighbors, Support Vector Machines, Perceptrons, Naive Bayes, Decision Trees, and Logistic Regression models.

Figure 5:
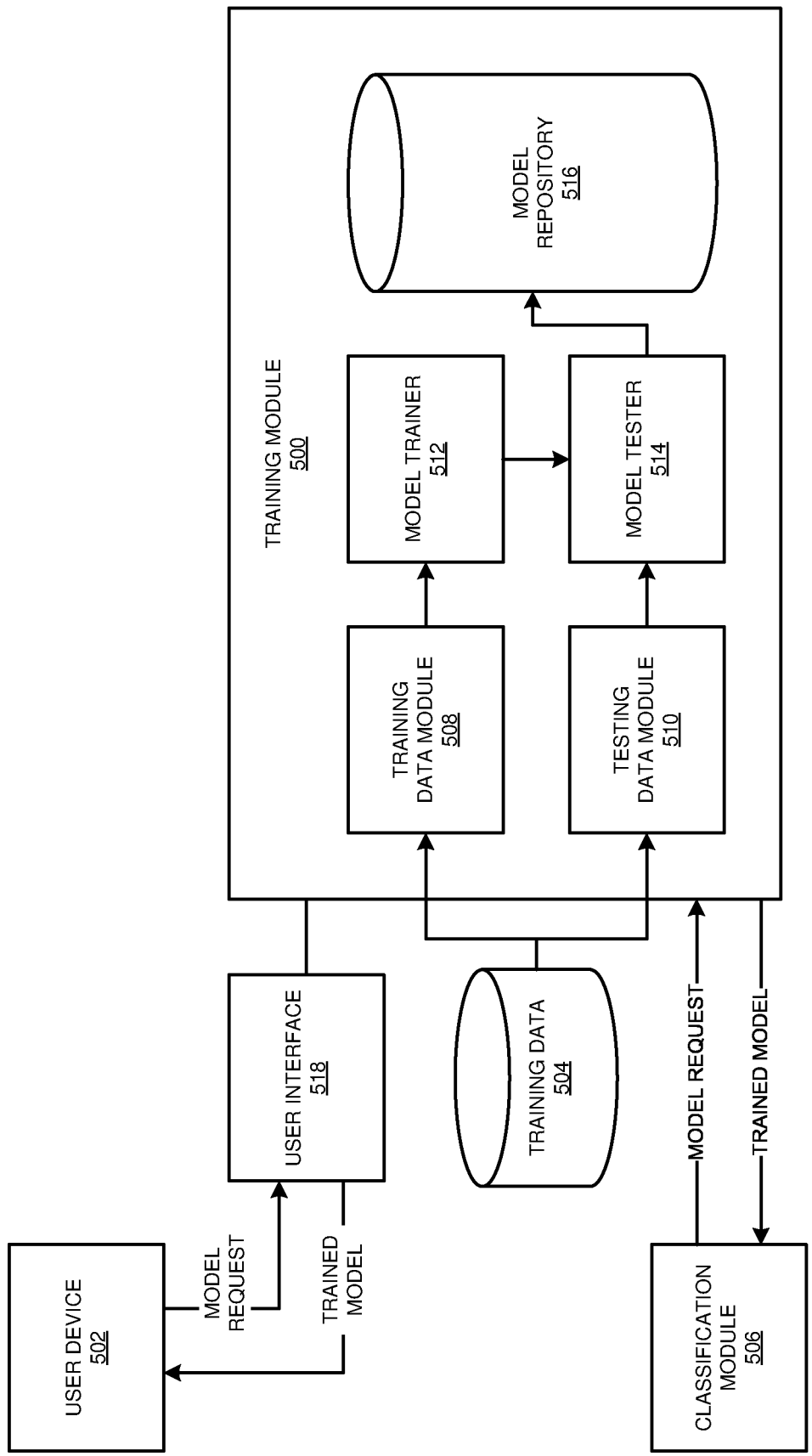
FIG. 5 depicts a block diagram of an example training module in accordance with an illustrative embodiment.

With reference to FIG. 5, this figure depicts a block diagram of an example training module 500 in accordance with an illustrative embodiment. In a particular embodiment, the training module 500 is an example of the training module 408 of FIG. 4.

In some embodiments, the training module 500 includes a training data module 508, testing data module 510, model trainer 512, model tester 514, and model repository 516. In alternative embodiments, the training module 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the training module 500 operates according to user inputs from a user device 502 via a user interface 518, which is an example of the user interface 406 of FIG. 4. In some embodiments, the training module 500 trains and provides trained models for use by other systems in response to model requests. In some embodiments, the training module 500 trains and provides trained models for use by a local classification module 506, which is an example of classification module 412 of FIG. 4.

In some embodiments, the training module 500 generates a multi-class classifier model having a series of binary classifiers. In an embodiment, the binaries are selected from, and/or based on one or more known classifier structures/systems, such as K-Nearest Neighbors, Support Vector Machines, Perceptrons, Naive Bayes, Decision Trees, and Logistic Regression models. In an embodiment, training module 500 includes a model trainer 512 that trains the multi-class classifier model using training data 504 appropriate for the current domain being modeled. For example, in an embodiment, the classification model is intended to classify images according to what is depicted or classify text based on topic or sentiment being expressed.

In some embodiments, the training data module 508 and testing data module 510 receive training data 504 and provide memory storage, buffering, and one or more pre-processing functions, such as format conversion, amplitude normalization, phase shifting, frequency weighting, blanking, summation, and filtering. The model trainer 512 uses the training data to generate a trained machine-learning model for use by the classification module 506. The term "training data," as used herein, refers to data that is familiar to users seeking to train a machine-learning model. For example, in some embodiments, the training data includes a training dataset designed to train a machine-learning model that will be able to generalize enough to accurately make predictions about new data, for example about features or objects that are not identical to those in the training dataset. In some embodiments, the training module 500 receives training data 504 and divides it into a training data set provided to the training data module 508 and a testing data set provided to the testing data module 510 so that the trained model can be tested for problems, such as overfitting, before the trained model is ready for production.

In some embodiments, the model trainer 512 that receives the training data from the training data module 508 and tries to "learn" from it by creating generalized mappings between input and output data for making predictions for new inputs where the output variable is unknown. In some embodiments, the model trainer 512 uses any of a variety of known algorithms having tunable parameters that are adjusted during the training phase to improve the accuracy of the model's predicted outputs for new inputs.

In some embodiments, the training module 500 includes a model tester 514 that monitors the model's ability to make predictions for the testing data set provided by the testing data module 510. For example, in some embodiments, the testing data set includes data that has been processed by the testing data module 510. In other embodiments, the testing data set includes data that has been staged or buffered, but not otherwise preprocessed, by the testing data module 510 (or has been subjected to less pre-processing than the training data) in order to allow the model tester 514 to evaluate the model's ability to generalize and accurately make predictions about the new data of the testing data set 512.

In some embodiments, the model trainer 512 performs an adaptive one-vs-all technique, which is a method to train n distinct classifiers, transforming a multi-class classification problem into a series of binary classification problems. More specifically, the model trainer 512 builds a multi-class classifier having a series of binary classifiers with one classifier for each class. The model trainer 512 takes a random sampling of training data and runs it through the series of binary classifiers, setting aside classified data points after each binary classifier. Each pass through the series of binary classifiers is an epoch. The model trainer 512 performs multiple epochs with the order of binary classifiers and/or the types of binary classifiers changing for each epoch. The model trainer 512 then compares the performance of each epoch to determine best arrangement for the multi-class classifier.

As a non-limiting example, suppose a training dataset sample has data points for three classes that will be referred to as Class 1, Class 2, and Class 3. The model trainer 512 builds a multi-class classifier having three binary classifiers connected in series. Each binary classifier is associated with a respective one of the three classes. For the first epoch, the binary classifiers are arranged such that the first binary classifier is associated with Class 1, the second binary classifier is associated with Class 2, and the third binary classifier is associated with Class 3. Note that it is not necessary for the classifiers to be arranged in any particular order for the first epoch; any arrangement may be selected. Each of the binary classifiers uses a one-versus-all approach to classifying data points. This means that the first binary classifier, being associated with Class 1, will classify each inputted data point as either Class 1 or Not Class 1 (i.e., Classes 2 and 3), the second binary classifier, being associated with Class 2, will classify each inputted data point as either Class 2 or Not Class 2 (i.e., Classes 1 and 3), and the third binary classifier, being associated with Class 3, will classify each inputted data point as either Class 3 or Not Class 3 (i.e., Classes 1 and 2).

The model trainer 512 commences the training process by inputting data points from the training dataset into the first binary classifier. The first binary classifier, being associated with class 1, labels all data points it predicts as Class 1 with a "1" and labels the rest with a "0." The data points having the label "1" are set aside, and the data points having the label "0" are inputted into the second binary classifier. The second binary classifier, being associated with class 2, labels all data points it predicts as Class 2 with a "1" and labels the rest with a "0." The data points having the label "1" are set aside, and the data points having the label "0" are inputted into the third binary classifier. The third binary classifier, being associated with class 3, labels all data points it predicts as Class 3 with a "1" and labels the rest with a "0." The data points having the label "1" are set aside, and the data points having the label "0" are inputted into a final classifier.

At the final classifier stage, there might still be some data points that were not classified by any of the binary classifiers. The last classifier is configured as a catch-all that predicts categories for all remaining data points. In some embodiments, the final classifier is a multi-class voting classifier to predict the remaining entries. For example, in some embodiments, the final classifier classifies a data point by comparing the confidence scores from each of the binary classifiers and classifies the data point with the class associated with the binary classifier that output the highest confidence score. For example, suppose the threshold values are set to 0.8, and a particular data point was given a confidence score of 0.6 from the first binary classifier, a confidence score of 0.3 from the second binary classifier, and a confidence score of 0.1 from the third binary classifier. None of these values met the threshold value of 0.8, but the first binary classifier gave the highest confidence score of 0.6, so this data point is classified as Class 1.

In some embodiments, once all of the data points have been classified, the confidence scores associated with each classification result are combined into an overall confidence score, which is then associated with this first epoch. The model trainer 512 then selects another sequence for the binary classifiers, for example Class 2, followed by Class 3, followed by Class 1. The model trainer 512 then repeats the same procedure as the first epoch, passing the training data through each of the binary classifiers in succession and setting aside classified data points after each binary classifier, until all of the data points have been classified and an overall confidence score is determined for the second epoch. In some embodiments, the model trainer 512 continues performing epochs, each with a unique sequence of binary classifiers, until every possible permutation has been tried or a threshold number of epochs has been reached. The model trainer 512 then compares the overall confidence scores from each epoch and establishes the final configuration of the multi-class classifier as the configuration that produced the highest overall confidence score.

Figure 6:
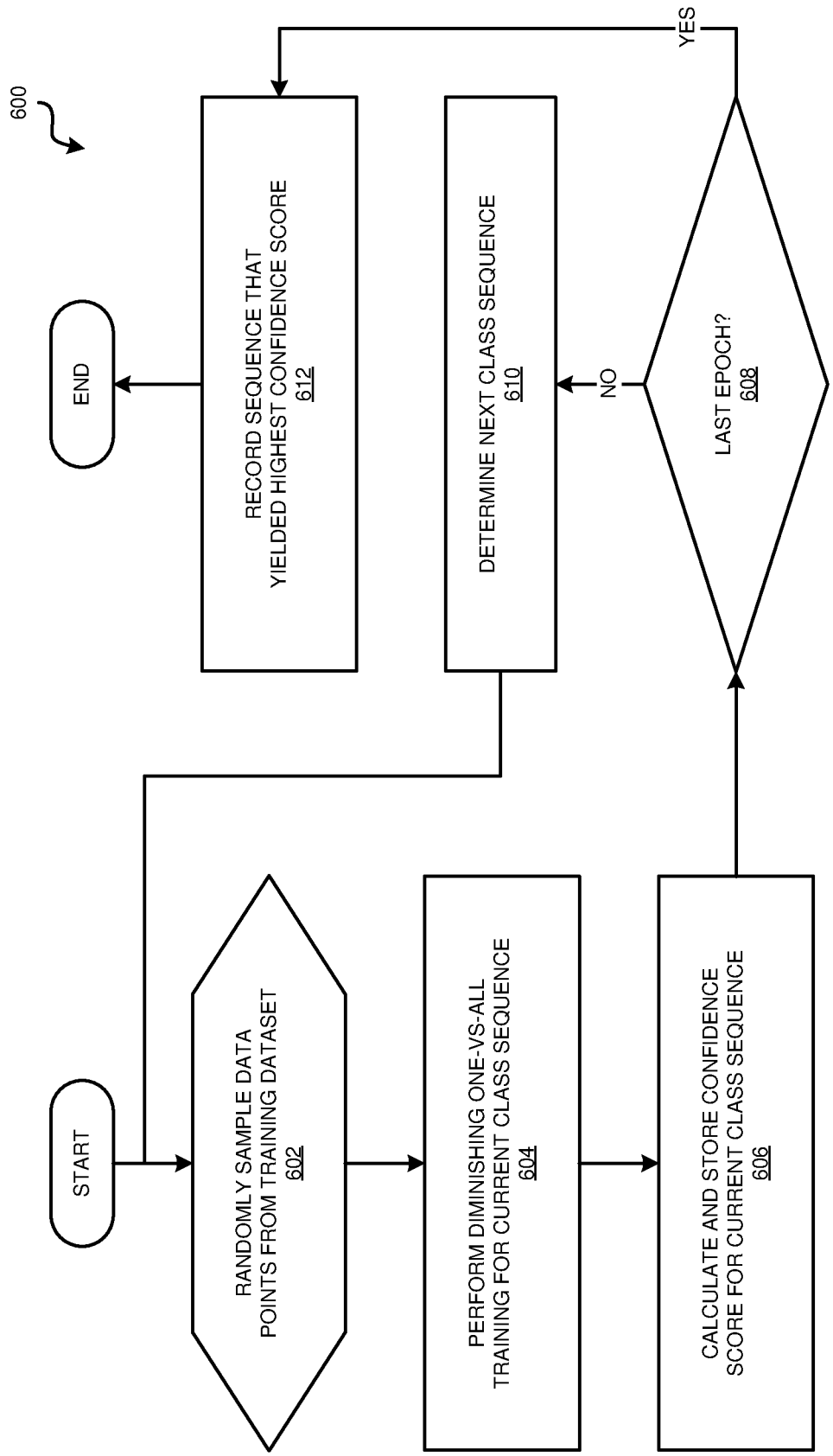
FIG. 6 depicts a flowchart of an example process for classifier processing using multiple binary classifier stages in accordance with an illustrative embodiment.

With reference to FIG. 6, this figure depicts a flowchart of an example process 600 for classifier processing using multiple binary classifier stages in accordance with an illustrative embodiment. In a particular embodiment, the training module 500 carries out the process 600.

In an embodiment, at block 602, the process generates a training batch of data points from training data associated with a plurality of classes by randomly sampling data points from the training dataset. Next, at block 604, the process performs a diminishing one-versus-all training epoch. In some embodiments, the process builds a multi-class classifier having a series of binary classifiers arranged in a first order, where each of the binary classifiers is associated with a respective class of the plurality of classes. The process runs the training batch of data points through the series of binary classifiers. As the data points progress through the series of binary classifiers, the process removes classified data points from consideration by subsequent binary classifiers. Next, at block 606, once all of the data points have been classified, the process uses the confidence scores associated with each classification result and combines the scores into an overall confidence score, which is then associated with this epoch.

Next, at block 608, the process determines if another epoch should be performed. For example, in some embodiments, the process continues performing epochs with the binary classifiers arranged each time in a different order until every possible permutation has been tried or a threshold number of epochs has been reached. If a designated stop criterion has not been reached, the process continues to block 610. At block 610, the process rearranges the order of the binary classifiers. For example, in some embodiments, the process randomly selects a new order in which to arrange the series of binary classifiers. In some embodiments, the process checks to verify that the randomly selected order has not already been used, and randomly selects another order if it has already been used, until a unique order of classes is determined. The process then repeats blocks 602 through 608 for the next epoch.

Once the last epoch has been completed at block 608, the process continues to block 612. At block 612, the process determines and stores a final configuration for the multi-class classifier. In some embodiments, the process compares the overall confidence scores from each epoch and establishes the final configuration of the multi-class classifier as the configuration that produced the highest overall confidence score.

Figure 7:
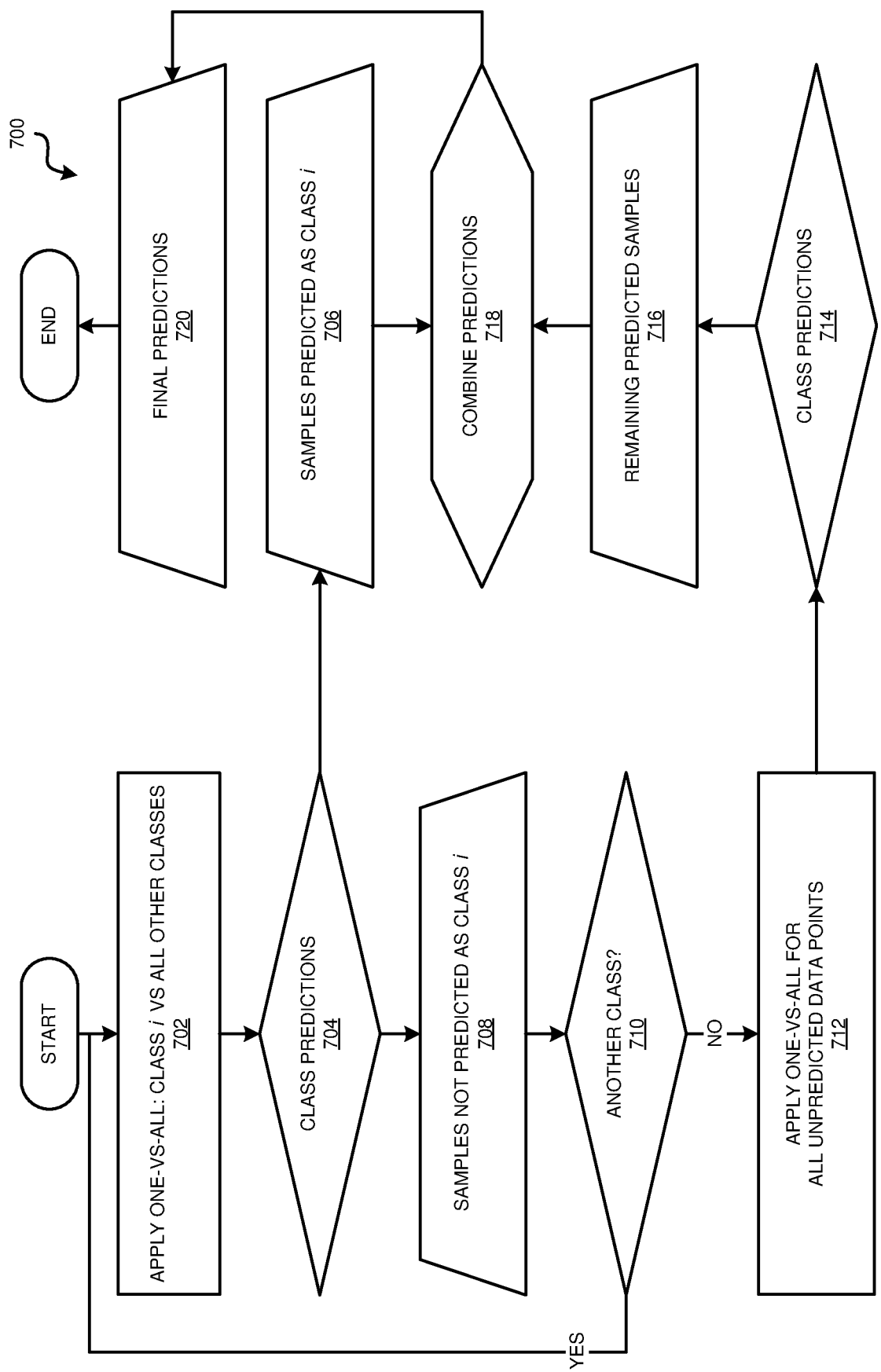
FIG. 7 depicts a flowchart of an example process for performing a diminishing one-versus-all training sequence in accordance with an illustrative embodiment.

With reference to FIG. 7, this figure depicts a flowchart of an example process 700 for performing a diminishing one-versus-all training process in accordance with an illustrative embodiment. In a particular embodiment, the process 700 is an example of block 604 of FIG. 6.

In the illustrated embodiment, a training process is described for training a multi-class classifier to distinguish between n classes, where n may be any integer. For the sake of explanation, the classes may be numbered and represented as classes $A=\{i|1 \leq i \leq n\}$. The multi-class classifier comprises a series of n one-versus-all binary classifiers. Each binary classifier is a one-versus-all classifier configured to distinguish between a respective class i and all other classes $A \setminus \{i\}$. The process begins at block 702, where a training batch of data points or "samples" is inputted to the first binary classifier in the series of one-versus-all classifiers. The binary classifier processes each data point and predicts whether each data point belongs in class i or the "all other" class (i.e., classes $A \setminus \{i\}$). In some embodiments, the binary classifier outputs a confidence value representative of a likelihood that the data point under consideration belongs in class i.

Next, at block 704, the process determines whether each data point is considered to be "classified" or "predicted" as belonging in class i. In some embodiments, a data point is considered to be classified as class i if the confidence value exceeds a threshold confidence value. In some embodiments, the threshold confidence value is a user-defined threshold value. As indicated at block 706, data points predicted as class i are set aside and are not evaluated by any of the binary classifiers remaining in the series of binary classifiers. As indicated at block 708, the remaining data points that have not yet been classified are carried forward.

At block 710, if there is another binary classifier in the series of binary classifiers, the process returns to block 702 for the next binary classifier. Otherwise, at block 712, the process classifies any remaining data points that have not yet been classified by any of the series of binary classifiers. In some embodiments, the process performs a multi-class voting classification technique that classifies a data point by comparing the confidence scores from each of the binary classifiers for the data point and applies the classification for which the data point received the highest confidence score.

For example, suppose the threshold confidence values are set to 0.8, and a particular data point was processed by a multi-class classifier having a series of three binary classifiers (n=3). The data point received a confidence score of 0.6 from the first binary classifier, a confidence score of 0.3 from the second binary classifier, and a confidence score of 0.2 from the third binary classifier. None of these values met the threshold confidence value of 0.8, so the data point was not classified. The process, at block 714, compares the confidence values from each of the binary classifiers, determines the highest of the confidence values, and outputs the classification for this data point as indicated at block 716 where the remaining data point classifications are collected.

In the above example, since the output from the first binary classifier of 0.6 was the highest confidence value for this data point, the data point would be classified as belonging to the class associated with the first binary classifier. Finally, at block 718, the data point classifications collected at block 706 by each binary classifier are combined with the data point classifications at block 716 that were classified by the final catch-all classifier, and stored at block 720 as a set of final classifications for each data point in the training batch of data points.

In some embodiments, once all of the data points have been classified, the confidence scores associated with each classification result are combined into an overall confidence score, which is then associated with the process 700 as a first epoch. In some such embodiments, the binary classifiers are rearranged and the process 700 is then repeated for another epoch in which the classes are evaluated in a different order. In some such embodiments, the order of classes is randomly determined for each epoch. In some embodiments, the process 700 is repeated for a plurality of epochs, with each epoch having a unique sequence of binary classifiers (and therefore a unique sequence of classes). In some such embodiments, the process 700 performs these epochs until every possible permutation has been tried or a threshold number of epochs has been reached. The overall confidence scores from each epoch are then compared, and the final configuration of the multi-class classifier is established as the configuration that produced the highest overall confidence score.

Figure 8:
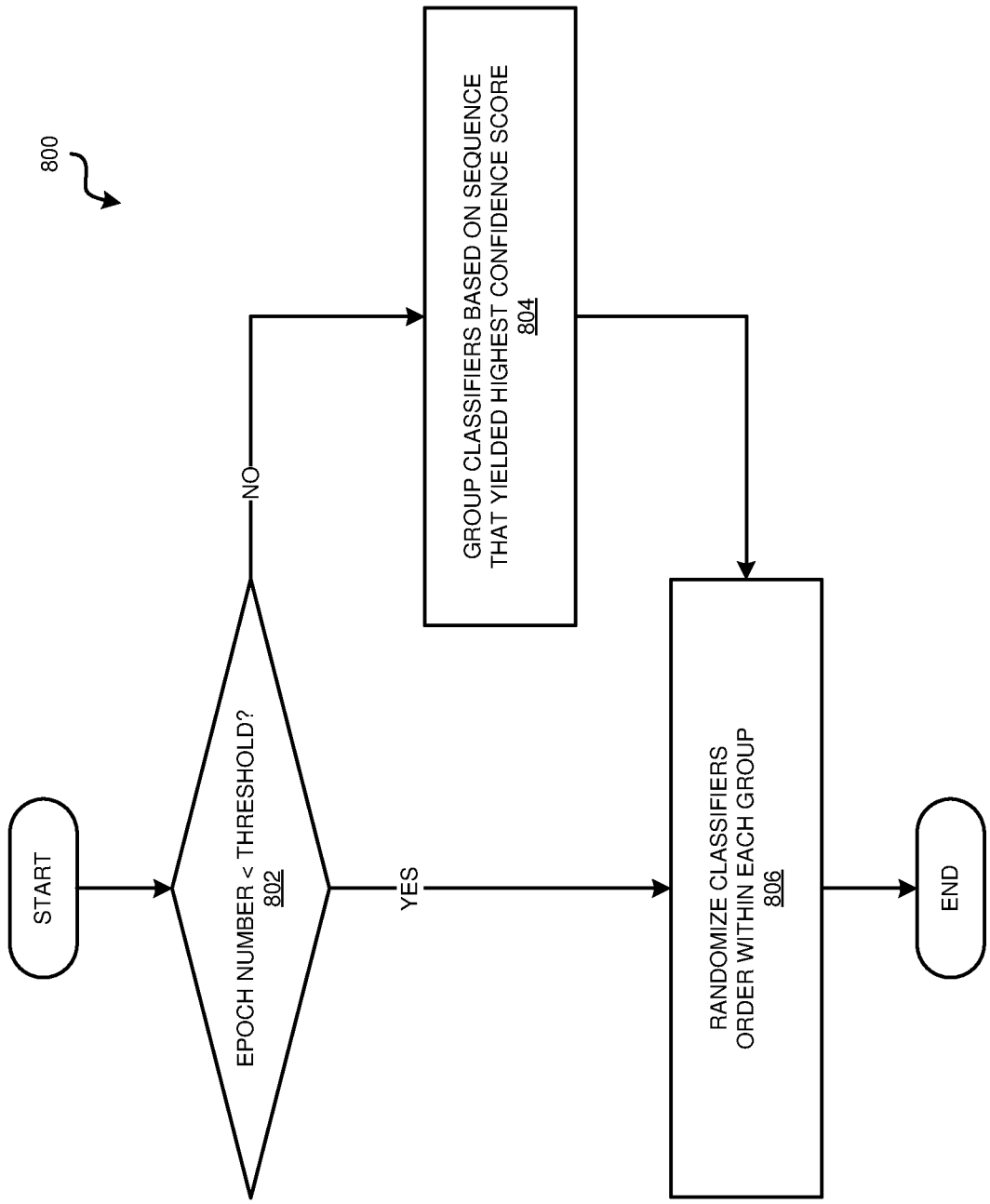
FIG. 8 depicts a flowchart of an example process for determining a class sequence for a series of binary classifiers in accordance with an illustrative embodiment.

With reference to FIG. 8, this figure depicts a flowchart of an example process 800 for determining a class sequence for a series of binary classifiers in accordance with an alternative embodiment. In a particular embodiment, the process 800 is an example of block 610 of FIG. 6.

In this alternative embodiment, once an epoch has been completed, the process 800 begins at block 802 where the process determines if a threshold number of epochs have been performed. If the number of epochs is still less than the threshold epoch number, the process continues to block 806. At block 806, the binary classifiers are rearranged. Initially, the classifiers are treated as a single group, so the binary classifiers are rearranged into a randomly determined order. If the threshold number of epochs has been reached at block 802, the process proceeds to block 804.

At block 804, the process arranges the classifiers based on the sequence that yielded highest confidence score, and then divides that sequence of classifiers into two or more groups. For example, suppose a multi-class classifier has eight binary classifiers associated with eight respective classes Class 1 through Class 8. After a threshold number of epochs, the process at block 804 determines that the classifier order that yielded the highest confidence score is 1-3-7-4-6-2-8-5. This sequence is then divided into two equal groups, with the first group being classes 1-3-7-4 and the second group being 6-2-8-5. At block 806, the order of classifiers in each group is then rearranged into random new orders, such as 7-3-4-1 for the first group and 8-2-6-8 for the second group, with the groups remaining in the same order. In some embodiments, the process 700 is then performed with the classifiers in this order.

Figure 9:
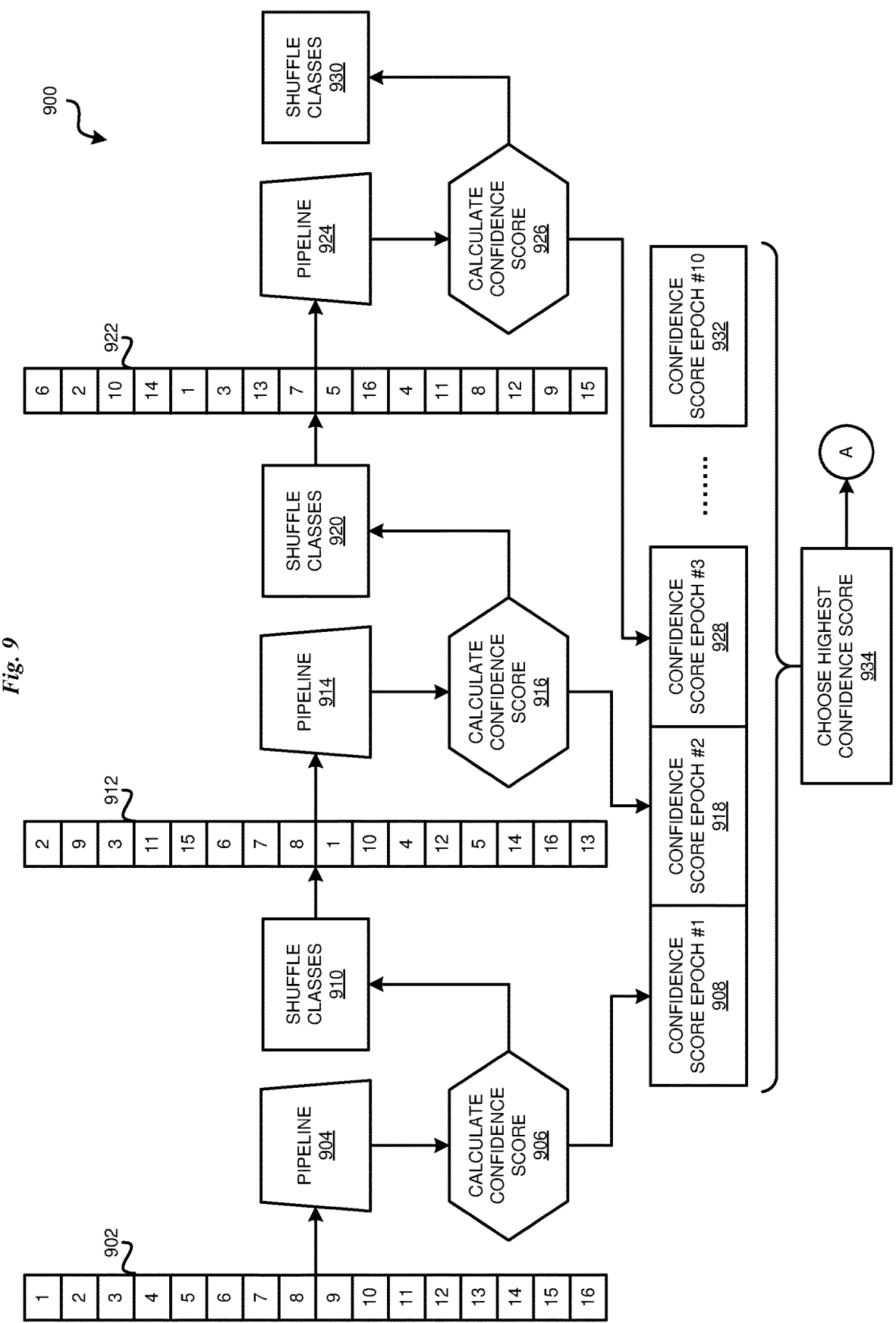
FIG. 9 depicts a schematic flow diagram of an example first epoch of a classification process in accordance with an illustrative embodiment.

With reference to FIG. 9, this figure depicts a schematic flow diagram of an example first epoch of a training process 900 in accordance with an illustrative embodiment. In a particular embodiment, the training module 500 carries out the process 900.

In the illustrated embodiment, an example training process is described for training a multi-class classifier to distinguish between 16 classes, but this description is equally applicable to other numbers of classes. The multi-class classifier comprises a series of 16 one-versus-all binary classifiers represented initially as a first classifier series 902.

At block 904, the process performs a training process, such as process 700, with the binary classifiers arranged as series 902. At block 906, the confidence scores associated with each classification result are combined into an overall confidence score that is stored in memory at first epoch score memory 908. At block 910, the binary classifiers are rearranged, resulting in a second classifier series 912. In some embodiments, the order of classes is randomly determined for the second classifier series 912.

Next, at block 914, the process performs a training process, such as process 700, with the binary classifiers arranged as the second classifier series 912. At block 916, the confidence scores associated with each classification result are combined into an overall confidence score that is stored in memory at second epoch score memory 918. At block 920, the binary classifiers are again rearranged, resulting in a third classifier series 922.

Next, at block 924, the process once again performs a training process, such as process 700, but this time with the binary classifiers arranged as the third classifier series 922. At block 926, the confidence scores associated with each classification result are combined into an overall confidence score that is stored in memory at third epoch score memory 928. At block 930, the binary classifiers are again rearranged.

This process of rearranging the classifiers, performing the training process, calculating and storing the overall confidence score is repeated until a threshold number of epochs has been performed and the final overall confidence score is stored in the last epoch score memory 932. Next, at block 934, the process selects a classifier sequence as the sequence that produced the highest overall confidence score. In some embodiments, the selected sequence is used as the final configuration for the classifier. In alternative embodiments, the process continues to the process shown in FIG. 10.

With reference to FIG. 10, this figure depicts a schematic flow diagram of an example second epoch of a classification process 1000 in accordance with an illustrative embodiment. In a particular embodiment, the second epoch of a classification process 1000 is a second (or later) epoch of the process 900 of FIG. 9. Also, in some embodiments, the training module 500 carries out the process 1000.

In the illustrated embodiment, an example training process is described for training a multi-class classifier to distinguish between 16 classes, but this description is equally applicable to other numbers of classes. Also, the illustrated embodiment shows an example in which the sequence that produced the highest overall confidence score at block 934 of FIG. 9 was the third sequence (series 922 in FIG. 9). Therefore, this sequence is divided into four groups, resulting in grouped series 1002. Then, at block 1004, the binary classifiers within each of Groups 1-4 are randomly rearranged, resulting in grouped series 1006.

At block 1008, the process performs a training process, such as process 700, with the binary classifiers arranged as grouped series 1006. At block 1010, the confidence scores associated with each classification result are combined into an overall confidence score that is stored in memory at epoch score memory 1012. At block 1014, the binary classifiers within each of Groups 1-4 are again randomly rearranged, resulting in grouped series 1016.

Next, at block 1018, the process performs a training process, such as process 700, with the binary classifiers arranged as the grouped series 1016. At block 1020, the confidence scores associated with each classification result are combined into an overall confidence score that is stored in memory at epoch score memory 1022. At block 1024, the binary classifiers within each of Groups 1-4 are again randomly rearranged.

This process of rearranging the classifiers, performing the training process, calculating and storing the overall confidence score is repeated with the groups remaining in the same order, but with the binary classifiers (and classes) being randomly arranged in different orders each time, until a threshold number of epochs has been performed and the final overall confidence score is stored in the epoch score memory 1026. Next, at block 1026, the process selects a classifier sequence as the sequence that produced the highest overall confidence score. In some embodiments, at block 1030, the selected sequence is used as the final configuration for the classifier. In alternative embodiments, the process shown in FIG. 10 is repeated with incrementally smaller groups. For example, in some embodiments, the process shown in FIG. 10 is repeated, beginning with the arrangement that produced the highest confidence score at block 1028, which is then further divided into groups, for example by dividing each of Groups 1-4 divided into two groups, resulting in 8 groups of two classes/binary classifiers each. In some embodiments, the process shown in FIG. 10 is repeated until the groups are down to single classes/binary classifiers, and then the final configuration for the classifier is selected based on the highest confidence score.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
mitigating a classification bias induced by an imbalanced representation of a plurality of classes in training data, the mitigation comprising:
generating a training batch of data points from the training data;
building a multi-class classifier having a series of binary classifiers arranged in a first order, wherein each of the series of binary classifiers is associated with a respective class of the plurality of classes;
training the multi-class classifier with the series of binary classifiers being arranged in the first order using the training batch of data points, the training comprising, at each binary classifier in succession;
identifying a data point as belonging to a class from the plurality of classes resulting in a classified data point;
updating, prior to the training batch being inputted into a subsequent binary classifier, the training batch to exclude the classified data point from the training batch to form an updated training batch;
inputting the updated training batch to the subsequent binary classifier, the updating and inputting steps preventing a reclassification of the classified data point by the subsequent binary classifier thereby mitigating the classification bias, wherein the reclassification is a source of the classification bias intensification;
modifying the multi-class classifier by changing the order of the series of binary classifiers resulting in the series of binary classifiers being arranged in a second order;
repeating the training, the identifying, the updating, and the inputting steps using the multi-class classifier with the series of binary classifiers being arranged in the second order using the training batch of data points; and
selecting a final configuration of the multi-class classifier based at least in part on a comparison of first training results from training with the series of binary classifiers arranged in the first order to second training results from training with the series of binary classifiers arranged in the second order.

2. The method of claim 1, wherein the generating of the training batch of data points comprises randomly selecting the data points from the training data.

3. The method of claim 1, wherein each of the series of binary classifiers outputs a first value for data points predicted to be part of the class associated with the binary classifier and outputs a second value for data points predicted to be part of any other classes of the plurality of classes.

4. The method of claim 1, wherein training of the multi-class classifier further comprises applying a multi-class voting classifier to any data points remaining unclassified after progressing through the series of binary classifiers.

5. The method of claim 1, further comprising:
generating a first random order as the first order of arrangement of the series of binary classifiers; and
generating a second random order as the second order of arrangement of the series of binary classifiers.

6. The method of claim 1, wherein the modifying of the multi-class classifier comprises:
designating a plurality of groups of binary classifiers from the series of binary classifiers such that each of the binary classifiers is in exactly one of the plurality of groups; and
arranging the binary classifiers in each of the groups according to respective random orders of arrangement.

7. The method of claim 6, further comprising:
modifying the multi-class classifier by changing the order of the series of binary classifiers resulting in the series of binary classifiers being arranged in a third order; and
repeating the training of the multi-class classifier with the series of binary classifiers being arranged in the third order using the training batch of data points.

8. The method of claim 7, wherein the modifying of the multi-class classifier resulting in the series of binary classifiers being arranged in the third order comprises:
designating a plurality of sub-groups of binary classifiers from each of the groups of binary classifiers such that each of the binary classifiers is in exactly one of the plurality of sub-groups; and
arranging the binary classifiers in each of the sub-groups according to respective random orders of arrangement.

9. The method of claim 8, wherein each of the groups of binary classifiers includes an equal number of the sub-groups.

10. The method of claim 1, further comprising:
generating a first overall confidence score based on cumulative confidence scores from classifying each of the data points with the binary classifiers arranged in the first order; and
generating second overall confidence score based on cumulative confidence scores from classifying each of the data points with the binary classifiers arranged in the second order.

11. The method of claim 10, wherein the comparison of the first training results to the second training results comprises comparing the first overall confidence score to the second overall confidence score.

12. A computer program product, the computer program product comprising one or more computer readable storage media, and program instructions collectively stored on the one or more computer readable storage media, the program instructions executable by one or more processors to cause the one or more processors to perform operations comprising:
mitigating a classification bias induced by an imbalanced representation of a plurality of classes in training data, the mitigation comprising:
generating a training batch of data points from the training data;
building a multi-class classifier having a series of binary classifiers arranged in a first order, wherein each of the series of binary classifiers is associated with a respective class of the plurality of classes;
training the multi-class classifier with the series of binary classifiers being arranged in the first order using the training batch of data points, the training comprising, at each binary classifier in succession;
identifying a data point as belonging to a class from the plurality of classes resulting in a classified data point;
updating, prior to the training batch being inputted into a subsequent binary classifier, the training batch to exclude the classified data point from the training batch to form an updated training batch;
inputting the updated training batch to the subsequent binary classifier, the updating and inputting steps preventing a reclassification of the classified data point by the subsequent binary classifier thereby mitigating the classification bias, wherein the reclassification is a source of the classification bias intensification;
modifying the multi-class classifier by changing the order of the series of binary classifiers resulting in the series of binary classifiers being arranged in a second order;
repeating the training, the identifying, the updating, and the inputting steps using the multi-class classifier with the series of binary classifiers being arranged in the second order using the training batch of data points; and
selecting a final configuration of the multi-class classifier based at least in part on a comparison of first training results from training with the series of binary classifiers arranged in the first order to second training results from training with the series of binary classifiers arranged in the second order.

13. The computer program product of claim 12, wherein the stored program instructions are stored in a computer readable storage device in a data processing system, and wherein the stored program instructions are transferred over a network from a remote data processing system.

14. The computer program product of claim 12, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

15. The computer program product of claim 12, wherein the generating of the training batch of data points comprises randomly selecting the data points from the training data.

16. The computer program product of claim 12, wherein each of the series of binary classifiers outputs a first value for data points predicted to be part of the class associated with the binary classifier and outputs a second value for data points predicted to be part of any other classes of the plurality of classes.

17. The computer program product of claim 12, wherein training of the multi-class classifier further comprises applying a multi-class voting classifier to any data points remaining unclassified after progressing through the series of binary classifiers.

18. A computer system comprising one or more processors and one or more computer readable storage media, and program instructions collectively stored on the one or more computer readable storage media, the program instructions executable by the one or more processors to cause the one or more processors to perform operations comprising:

mitigating a classification bias induced by an imbalanced representation of a plurality of classes in training data, the mitigation comprising:

generating a training batch of data points from the training data;

building a multi-class classifier having a series of binary classifiers arranged in a first order, wherein each of the series of binary classifiers is associated with a respective class of the plurality of classes;

training the multi-class classifier with the series of binary classifiers being arranged in the first order using the training batch of data points, the training comprising, at each binary classifier in succession;

identifying a data point as belonging to a class from the plurality of classes resulting in a classified data point;

updating, prior to the training batch being inputted into a subsequent binary classifier, the training batch to exclude the classified data point from the training batch to form an updated training batch;

inputting the updated training batch to the subsequent binary classifier, the updating and inputting steps preventing a reclassification of the classified data point by the subsequent binary classifier thereby mitigating the classification bias, wherein the reclassification is a source of the classification bias intensification;

modifying the multi-class classifier by changing the order of the series of binary classifiers resulting in the series of binary classifiers being arranged in a second order;

repeating the training, the identifying, the updating, and the inputting steps using the multi-class classifier with the series of binary classifiers being arranged in the second order using the training batch of data points; and selecting a final configuration of the multi-class classifier based at least in part on a comparison of first training results from training with the series of binary classifiers arranged in the first order to second training results from training with the series of binary classifiers arranged in the second order.

19. The computer system of claim 18, wherein the generating of the training batch of data points comprises randomly selecting the data points from the training data.

20. The computer system of claim 18, wherein each of the series of binary classifiers outputs a first value for data points predicted to be part of the class associated with the binary classifier and outputs a second value for data points predicted to be part of any of any other classes of the plurality of classes.

* * * * *